(12) United States Patent
Saputera et al.

(10) Patent No.: US 12,246,473 B2
(45) Date of Patent: Mar. 11, 2025

(54) INERT ULTRAVIOLET CURING APPARATUS

(71) Applicant: Transitions Optical, Ltd., Tuam (IE)

(72) Inventors: Yani Saputera, The Colony, TX (US);
Lawrence M. Minor, McKinney, TX (US); Lex Pace, Largo, FL (US);
Willard Beamer, Palmetto, FL (US)

(73) Assignee: Transitions Optical, Ltd., Tuam (IE)

( * ) Notice: Subject to any disclaimer, the term of this patent is extended or adjusted under 35 U.S.C. 154(b) by 0 days.

(21) Appl. No.: 18/722,829

(22) PCT Filed: Dec. 22, 2021

(86) PCT No.: PCT/EP2021/087279
§ 371 (c)(1),
(2) Date: Jun. 21, 2024

(87) PCT Pub. No.: WO2023/117075
PCT Pub. Date: Jun. 29, 2023

(65) Prior Publication Data
US 2024/0416558 A1 Dec. 19, 2024

(51) Int. Cl.
*B29C 35/08* (2006.01)
*B29D 11/00* (2006.01)

(52) U.S. Cl.
CPC .... *B29C 35/0805* (2013.01); *B29D 11/00442* (2013.01); *B29C 2035/0827* (2013.01)

(58) Field of Classification Search
CPC ........ B29C 35/0805; B29C 2035/0827; B29D 11/00442; A61L 2/10; A61L 2/26; A61L 2202/00; A61L 2202/10; A61L 2202/11; A61L 2202/12; A61L 2202/121; A61L 2202/122; A61L 2202/13
See application file for complete search history.

(56) References Cited

U.S. PATENT DOCUMENTS

| | | | |
|---|---|---|---|
| 5,288,526 A | 2/1994 | Hogan et al. | |
| 6,808,757 B1 * | 10/2004 | Lambert | C09D 4/00 427/508 |
| 7,638,780 B2 * | 12/2009 | Kilburn | F26B 3/28 118/620 |
| 2005/0123435 A1 * | 6/2005 | Cutler | B65B 55/02 422/1 |
| 2021/0316520 A1 | 10/2021 | Evans et al. | |

* cited by examiner

*Primary Examiner* — Sean M Luck
(74) *Attorney, Agent, or Firm* — The Webb Law Firm

(57) ABSTRACT

A curing apparatus (100) includes a housing (102) having a loading portion (108) open to ambient atmosphere, a curing portion (110) having a curing chamber (124) with a controlled atmosphere, and a transition portion (112) extending between the loading portion (108) and the curing portion (110). A carrier (128) is movable between the loading portion (108) and the curing chamber (124) via the transition portion (112). The curing apparatus (100) further includes at least one ultraviolet radiation source (150) operative for transmitting ultraviolet radiation into the curing chamber (124). The transition portion (112) includes a plurality of baffles (158) protruding from a sidewall (120) of the transition portion (112) and configured for minimizing mixing between the ambient atmosphere and the controlled atmosphere during movement of the carrier (128) between the loading portion (108) and the curing chamber (124).

15 Claims, 4 Drawing Sheets

INERT ULTRAVIOLET CURING APPARATUS

CROSS REFERENCE TO RELATED APPLICATION

This application is the United States national phase of International Patent Application No. PCT/EP2021/087279 filed Dec. 22, 2021, the disclosure of which is hereby incorporated by reference in its entirety.

BACKGROUND OF THE INVENTION

Field of the Invention

The present invention relates to an inert ultraviolet curing apparatus for curing a coating of a coated article. In particular, the present invention relates to an ultraviolet curing apparatus having a curing portion with an inert atmosphere and a transfer portion for transferring the coated article between a loading portion and the curing portion. A method of curing a coated article using an inert ultraviolet curing apparatus is also disclosed.

Description of the Related Art

With optical articles, such as lenses, one or more surfaces may be subjected to a treatment to enhance the overall performance and function of the optical articles. Examples of such treatments include the formation of one or more coatings on a surface of an optical substrate.

In order to manufacture a coated optical article from an uncoated optical substrate, a variety of manufacturing techniques have been developed. In some processes, an uncoated optical substrate is first washed and dried, after which a coating is applied on at least one surface of the substrate. With coatings that require curing with ultraviolet light, the coated substrate is passed through a curing device having an ultraviolet radiation source. In large scale operations, optical substrates may be processed on an automated production line. Such a production line may have a plurality of processing stations for performing the various operations, including washing, drying, coating, and curing. It would be desirable to develop a new ultraviolet curing apparatus for curing coated optical substrates.

SUMMARY OF THE INVENTION

In some non-limiting examples or aspects of the present disclosure, provided is a curing apparatus that may include a housing having a loading portion open to ambient atmosphere, a curing portion having a curing chamber with a controlled atmosphere, and a transition portion extending between the loading portion and the curing portion. A carrier may be movable between the loading portion and the curing chamber via the transition portion. The curing apparatus further may include at least one ultraviolet radiation source operative for transmitting ultraviolet radiation into the curing chamber. The transition portion may include a plurality of baffles protruding from a sidewall of the transition portion and configured for minimizing mixing between the ambient atmosphere and the controlled atmosphere during movement of the carrier between the loading portion and the curing chamber.

In some non-limiting examples or aspects of the present disclosure, each of the plurality of baffles may be angled toward the loading portion. Each of the plurality of baffles may include a first end connected to the sidewall of the transition portion and a second, free end protruding toward a transition guideway of the transition portion. The plurality of baffles may include a first set of baffles extending from a first sidewall of the transition portion and a second set of baffles extending from a second sidewall of the transition portion. The plurality of baffles may be aligned such that a terminal end of the first set of baffles is positioned across from a terminal end of the second set of baffles.

In some non-limiting examples or aspects of the present disclosure, the loading portion may include a door for enclosing the loading portion. A transfer mechanism may be provided for moving the carrier between the loading portion and the curing portion. The transfer mechanism may include a motor, a linear actuator, or a rotary actuator.

In some non-limiting examples or aspects of the present disclosure, the carrier may include a rotatable holder configured to rotate about a rotation axis when the carrier is positioned in the curing chamber. The rotatable holder may include a vacuum chuck configured for securing an article to the rotatable holder using vacuum.

In some non-limiting examples or aspects of the present disclosure, at least one sensor may be provided in the curing chamber and may be configured for measuring oxygen content in the curing chamber. At least one nozzle may be in fluid communication with the curing chamber and may be configured for delivering an inert gas to the curing chamber. The at least one nozzle may be configured for delivering the inert gas to the curing chamber at a constant pressure and constant flow rate.

In some non-limiting examples or aspects of the present disclosure, a diffuser may be provided between the at least one nozzle and the curing chamber. The diffuser may be configured for diffusing a flow of the insert gas into the curing chamber. An ultraviolet radiation filter may be disposed between the at least one ultraviolet radiation source and the curing chamber.

A curing apparatus may be characterized by one or more of the following aspects.

In a first aspect, a curing apparatus configured for curing optical articles may have a housing having a loading portion open to ambient atmosphere, a curing portion having a curing chamber with a controlled atmosphere, and a transition portion extending between the loading portion and the curing portion; a carrier movable between the loading portion and the curing chamber via the transition portion; and at least one ultraviolet radiation source operative for transmitting ultraviolet radiation into the curing chamber, wherein the transition portion comprises a plurality of baffles protruding from a sidewall of the transition portion and configured for minimizing mixing between the ambient atmosphere and the controlled atmosphere during movement of the carrier between the loading portion and the curing chamber.

In a second aspect, in the curing apparatus in accordance with the first aspect, each of the plurality of baffles is angled toward the loading portion.

In a third aspect, in the curing apparatus in accordance with the first aspect or the second aspect, each of the plurality of baffles comprises a first end connected to the sidewall of the transition portion and a second, free end protruding toward a transition guideway of the transition portion.

In a fourth aspect, in the curing apparatus in accordance with any one of the first aspect to the third aspect, the plurality of baffles comprises a first set of baffles extending from a first sidewall of the transition portion and a second set of baffles extending from a second sidewall of the transition portion.

In a fifth aspect, in the curing apparatus in accordance with the fourth aspect, the plurality of baffles are aligned such that a terminal end of the first set of baffles is positioned across from a terminal end of the second set of baffles.

In a sixth aspect, in the curing apparatus in accordance with any one of the first aspect to the fifth aspect, the loading portion comprises a door for enclosing the loading portion.

In a seventh aspect, in the curing apparatus in accordance with any of one of the first aspect to the sixth aspect, a transfer mechanism is provided for moving the carrier between the loading portion and the curing portion.

In an eighth aspect, in the curing apparatus in accordance with the seventh aspect, the transfer mechanism comprises a motor, a linear actuator, or a rotary actuator.

In a ninth aspect, in the curing apparatus in accordance with any one of the first aspect to the eighth aspect, the carrier comprises a rotatable holder configured to rotate about a rotation axis when the carrier is positioned in the curing chamber.

In a tenth aspect, in the curing apparatus in accordance with the ninth aspect, the rotatable holder comprises a vacuum chuck configured for securing an article to the rotatable holder using vacuum.

In an eleventh aspect, in the curing apparatus in accordance with any one of the first aspect to the tenth aspect, at least one sensor is provided in the curing chamber and configured for measuring oxygen content in the curing chamber.

In a twelfth aspect, in the curing apparatus in accordance with any one of the first aspect to the eleventh aspect, at least one nozzle is in fluid communication with the curing chamber, wherein the at least one nozzle is configured for delivering an inert gas to the curing chamber.

In a thirteenth aspect, in the curing apparatus in accordance with the twelfth aspect, the at least one nozzle is configured for delivering the inert gas to the curing chamber at a constant pressure and constant flow rate.

In a fourteenth aspect, in the curing apparatus in accordance with any one of the first aspect to the thirteenth aspect, a diffuser is provided between the at least one nozzle and the curing chamber, the diffuser being configured for diffusing a flow of the insert gas into the curing chamber.

In a fifteenth aspect, in the curing apparatus in accordance with any one of the first aspect to the fourteenth aspect, an ultraviolet radiation filter is disposed between the at least one ultraviolet radiation source and the curing chamber.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting examples of the invention are illustrated and described.

BRIEF DESCRIPTION OF THE DRAWINGS

In FIGS. 1-6, like characters refer to the same components and elements, as the case may be, unless otherwise stated.

DETAILED DESCRIPTION OF THE INVENTION

Figure 1:
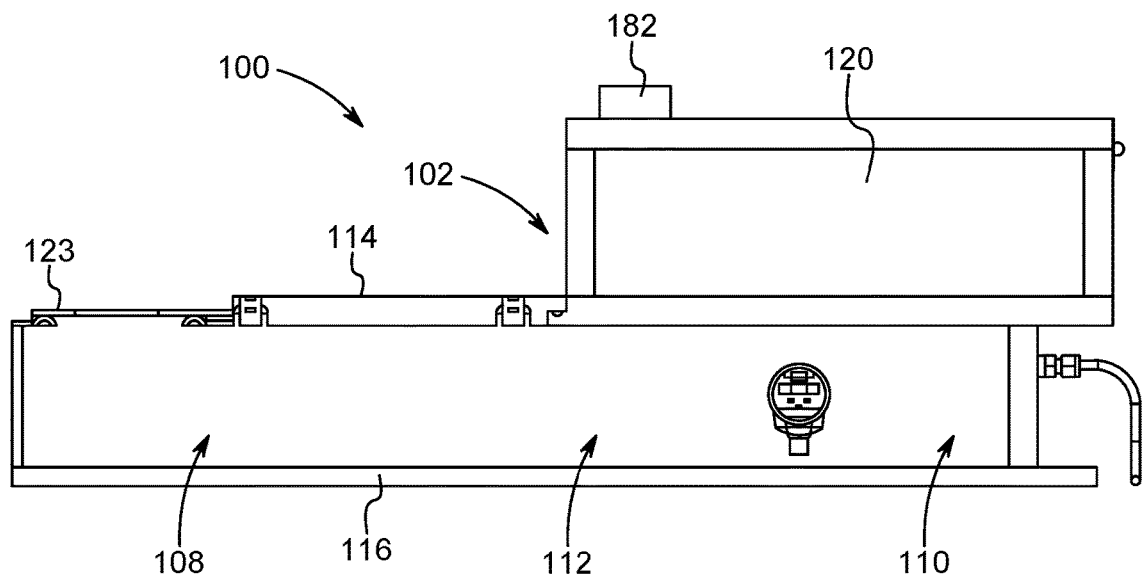
FIG. 1 is a representative side view of an inert ultraviolet curing apparatus in accordance with some examples of the present disclosure.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

The term "not greater than" is synonymous with "less than or equal to".

As used herein, "at least one of" is synonymous with "one or more of". For example, the phrase "at least one of A, B, or C" means any one of A, B, or C, or any combination of any two or more of A, B, or C. For example, "at least one of A, B, or C" includes A alone; or B alone; or C alone; or A and B; or A and C; or B and C; or all of A, B, and C.

The term "adjacent" means proximate to but not in direct contact with.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

As used herein, the term "baffle" or "baffles" refers to a physical structure configured to restrain a flow of gas within an interior of a curing apparatus.

The term "optical" means pertaining to or associated with light and/or vision. For example, an optical element, article, or device can be chosen from ophthalmic elements, articles, and devices; display elements, articles, and devices; visors; windows; and mirrors.

The term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least individual lenses, lens pairs, partially formed (or semi-finished) lenses, fully formed (or finished) lenses, and lens blanks.

As used herein, the term "transparent", such as used in connection with a substrate, film, material, and/or coating, means that the indicated substrate, film, material, and/or coating has the property of transmitting visible light without appreciable scattering so that objects lying beyond are visibly observable.

As used herein, the terms "ultraviolet", "UV", "ultraviolet light", or "ultraviolet radiation" mean electromagnetic radiation having a wavelength in the range of 10 nm to 400 nm.

As used herein, the term "coating" means a supported film derived from a flowable coating material, which can optionally have a uniform thickness, and specifically excludes polymeric sheets. The terms "layer" and "film" each encompass both coatings (such as a coating layer or a coating film) and sheets, and a layer can include a combination of separate layers, including sub-layers and/or over-layers. The verb "coating" means, within appropriate context, the process of applying a coating material (or materials) to the substrate to form a coating (or coating layer).

As used herein, the terms "cure", "cured", and related terms, mean that at least a portion of the polymerizable and/or crosslinkable components that form a curable composition are at least partially polymerized and/or cross-linked. In accordance with some examples, the degree of crosslinking can range from 5% to 100% of complete crosslinking. In accordance with some further examples, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the terms "communication" and "communicate" may refer to the reception, receipt, transmission, transfer, provision, and/or the like, of information (e.g., data, signals, messages, instructions, commands, and/or the like).

As used herein, a "graphical user interface" or "GUI" refers to a generated display with which a user may interact, either directly or indirectly (e.g., through a button, keyboard, mouse, touchscreen etc.).

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of the following examples of the invention, in any combination. Various examples of the invention may be discussed separately. However, it is to be understood that this is simply for ease of illustration and discussion. In the practice of the invention, one or more aspects of the invention described in one example can be combined with one or more aspects of the invention described in one or more of the other examples.

With reference to FIG. 1, the curing apparatus 100 is shown in accordance with some examples or aspects of the present disclosure. In various examples or embodiments, the curing apparatus 100 may be configured for curing a coating applied to at least one surface of an article. In some examples or aspects, the article may be an opaque article, a translucent article, and/or a transparent article. In some examples or aspects, the transparent article may be an optical article. The curing apparatus 100 may be configured for emitting ultraviolet radiation for curing the coating applied to the at least one surface of the article. While the following disclosure describes the curing apparatus 100 configured to cure a single optical article at a time, one of ordinary skill in the art would readily understand that the curing apparatus 100 may be scaled for curing any number of coated articles, including non-optical articles. Accordingly, the following disclosure is to be construed as exemplary only and is not intended to limit the configuration of the curing apparatus 100.

The curing apparatus 100 has a housing 102 defining a loading portion 108 that is open to ambient atmosphere, a curing portion 110 having a controlled atmosphere, and a transition portion 112 extending between the loading portion 108 and the curing portion 110. In some examples or aspects, the loading portion 108, the curing portion 110, and the transition portion 112 may be defined by a common housing. In other examples or aspects, the loading portion 108, the curing portion 110, and the transition portion 112 may have discrete housings that are combined together end-to-end to define the overall housing 102 of the curing apparatus 100.

With continued reference to FIG. 1, the housing 102 has an upper portion or sidewall 114 spaced apart from a lower portion or sidewall 116. An interior 118 of the housing 102 (shown in FIG. 2) is defined between the upper portion or sidewall 114 and the lower portion or sidewall 116, and between a pair of longitudinal portions or sidewalls 120. In some examples or aspects, the pair of longitudinal portions or sidewalls 120, the upper portion or sidewall 114, and/or the lower portion or sidewall 116 are discrete elements that are removably or non-removably connected to each other. In other examples, the pair of longitudinal portions or sidewalls 120, the upper portion or sidewall 114, and/or the lower portion or sidewall 116 may be monolithically formed with each other.

Figure 2:
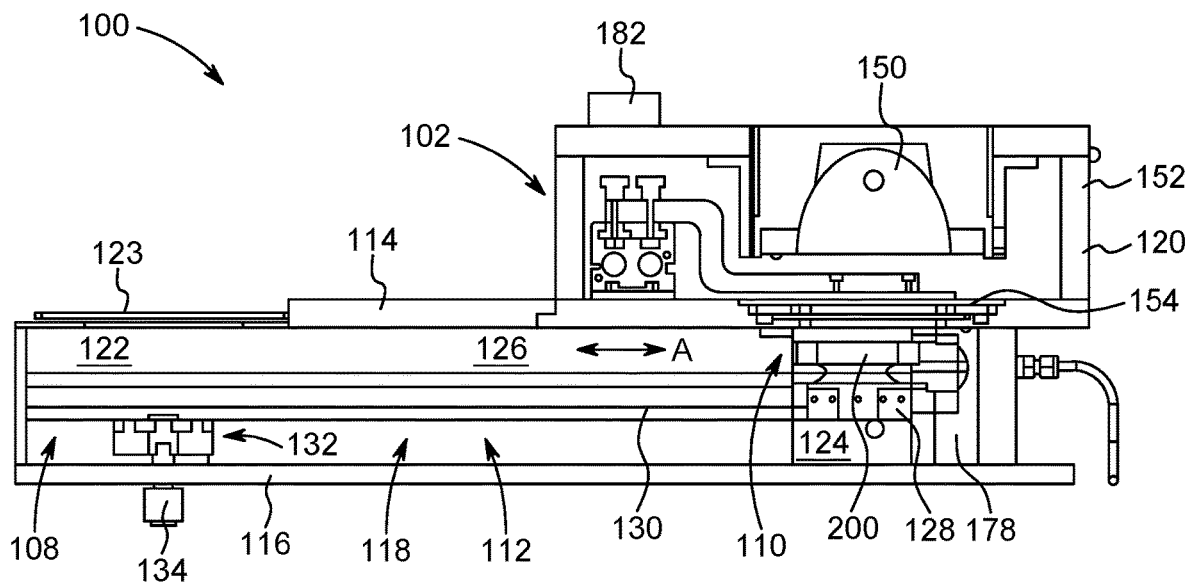
FIG. 2 is a representative side cross-sectional view of the inert ultraviolet curing apparatus shown in FIG. 1.

With reference to FIG. 2, the loading portion 108, the curing portion 110, and the transition portion 112 define separate chambers within the interior 118 of the housing 102. The loading portion 108 has a loading chamber 122 configured for receiving an optical article 200 during loading and loading. The loading portion 108 is open to ambient atmosphere and may be enclosed by a door 123. The curing portion 110 has a curing chamber 124 having the controlled atmosphere for curing the optical article 200. The loading chamber 122 and the curing chamber 124 are connected to each other via a transition chamber 126 of the transition portion 112.

With reference to FIG. 2, the curing apparatus 100 includes a carrier 128 movable between the loading chamber 122 and the curing chamber 124 via the transition chamber 126. The carrier 128 is movable between the loading chamber 122 and the curing chamber 124 on a rail 130 in a direction of arrow A in FIG. 2. In some examples or aspects, the rail 130 may be linear or curvilinear. The carrier 128 is supported on an upper portion of the rail 130 and is movable between the loading chamber 122 and the curing chamber 124 via a transfer mechanism 132. As described herein, the carrier 128 is configured for supporting an optical article for moving the optical article between the loading portion 108 and the curing portion 110. In some examples or aspects, the transfer mechanism 132 includes a drive element 134, such as motor, a linear actuator, or a rotary actuator that is operatively connected to the carrier 128. The carrier 128 may be operatively connected to the drive element 134 via a belt, chain, rod, or other mechanical connection. Actuation of the transfer mechanism 132 may be controlled by a controller, as described hereinafter, and results in movement of the carrier 128. Operation of the transfer mechanism 132 may be controlled by the controller to control the starting and stopping positions and speed at which the carrier 128 moves between the loading chamber 122 and the curing chamber 124. In some embodiments or aspects, the speed at which the carrier 128 moves may be different when moving from the loading chamber 122 into the curing chamber 124 compared to the speed when moving from the curing chamber 124 to the loading chamber 122.

Figure 3:
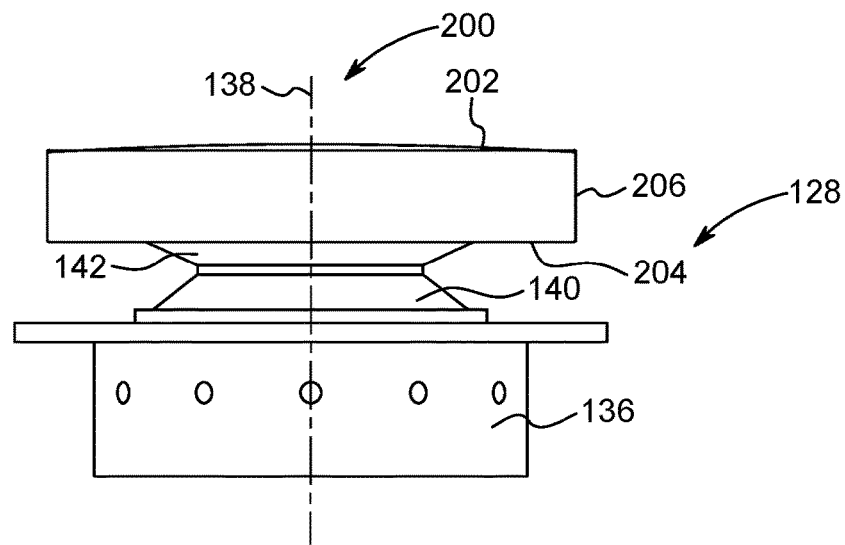
FIG. 3 is a representative side view of a carrier configured for use with the inert ultraviolet curing apparatus.

With reference to FIG. 3, the carrier 128 has a rotatable holder 136 configured to rotate about a rotation axis 138. In some examples or aspects, the rotatable holder 136 is configured to be rotatable about the rotation axis 138 when the carrier 128 is positioned in the curing chamber 124. The carrier 128 further has a support platform 140 configured for supporting an optical article 200 thereon. The support platform 140 may have a vacuum chuck 142 configured for securing the optical article 200 on the carrier 128 using vacuum. In this manner, the optical article 200 may be supported on its lower surface without any additional mechanical fixturing that may contact a coated surface of the optical article 200.

With continued reference to FIG. 3, the optical article 200 has a forward or top surface 202, a rearward or bottom surface 204, and a side surface 206 extending between the top surface 202 and the bottom surface 204. When the optical article 200 is an ophthalmic lens, the bottom surface 204 is opposed to the eye of an individual wearing the optical article 200, the side surface 206 typically resides within a supportive frame, and the top surface 202 faces incident light (not shown), at least a portion of which passes through the optical article 200 and into the individual's eye. With some examples or aspects, at least one of the top surface 202, the bottom surface 204, and the side surface 206 may have various shapes including, but not limited to, round, flat, cylindrical, spherical, planar, substantially planar, plano-concave and/or plano-convex, and curved, including, but not limited to, convex, and/or concave. The optical article 200 is configured to be supported on the support platform 140 of the carrier 128, such as by the bottom surface 204. In some examples or aspects, the optical article 200 may be supported on the support platform 140 of the carrier 128 by the side surface 206.

The optical article 200 can be selected from ophthalmic articles or elements, display articles or elements, visors, windows, mirrors, active liquid crystal cell articles or elements, and passive liquid crystal cell articles or elements. Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. Examples of display articles, elements and devices include, but are not limited to, screens, monitors, and security elements, including without limitation, security marks and authentication marks. Examples of windows include, but are not limited to, automotive and aircraft transparencies, filters, shutters, and optical switches. The optical article 200 can comprise a polymeric organic material chosen from thermosetting polymeric organic materials, thermoplastic polymeric organic materials, or a mixture of such polymeric organic materials.

With reference to FIG. 2, the curing apparatus 100 has at least one ultraviolet radiation source 150 (hereinafter referred to "UV source 150") operative for transmitting ultraviolet (UV) radiation into the curing chamber 124. In some examples or aspects, the curing apparatus 100 may have a plurality of UV sources 150. The at least one UV source 150 may be mounted in an upper portion 152 of the housing 102 such that the at least one UV source 150 directs UV radiation into the curing chamber 124 from the upper portion 152 of the housing 102. The at least one UV source 150 is positioned such that at least a portion of the UV radiation emitted therefrom is incident on at least one surface of the optical article 200 when the optical article 200 is positioned in the curing chamber 124. In some examples, the at least one ultraviolet radiation source 150 may be an ultraviolet lamp having at least one bulb, such as a mercury bulb, configured for emitting radiation within the ultraviolet spectrum. The specifications of the at least one ultraviolet radiation source 150 may be selected depending on a type of coating to be cured.

With continued reference to FIG. 2, a filter 154 may be positioned between the at least one UV source 150 and the curing chamber 124. The filter 154 may be configured for filtering the UV radiation from the at least one UV source 150, such as filtering radiation of a desired wavelength. The filtering characteristics of the filter 154 may be selected depending on a desired wavelength of ultraviolet radiation to be filtered. The curing apparatus 100 may have at least one reflective element positioned within the curing chamber 124 to reflect at least a portion of UV radiation emitted from the at least one UV source 150 in a direction toward the optical article 200. In some examples, the at least one reflective element may be a reflective mirror, or a mirror-like film.

Figure 4:
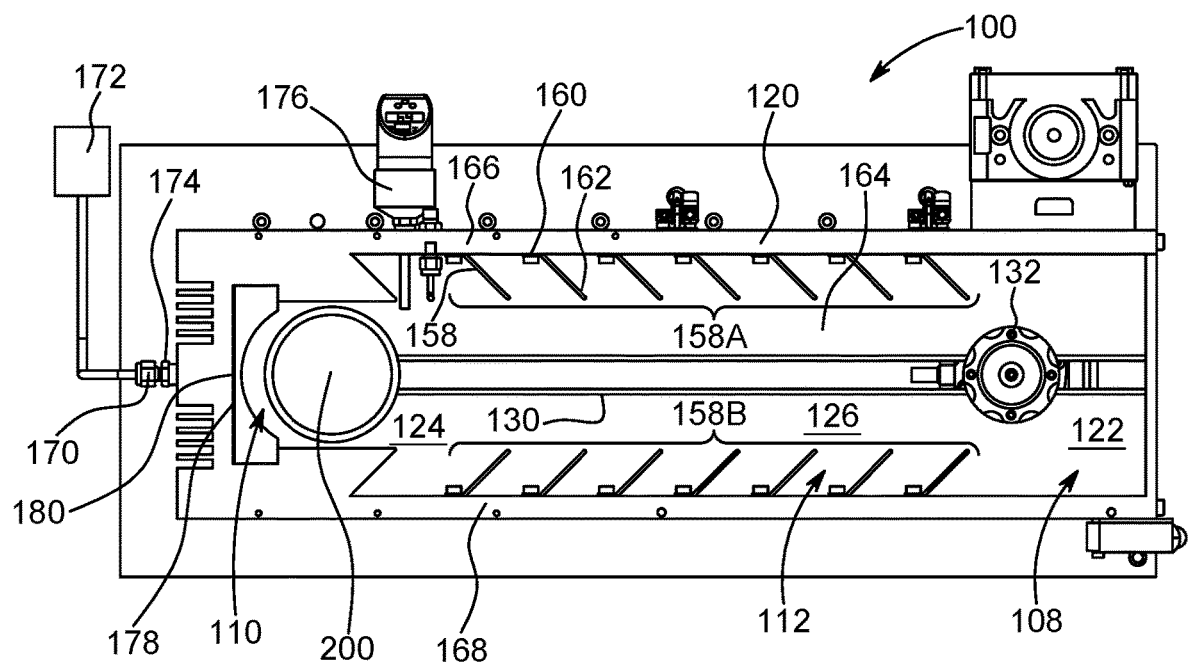
FIG. 4 is a representative top view of the inert ultraviolet curing apparatus shown in FIG. 1 with a top portion of a housing removed.
Figure 5:
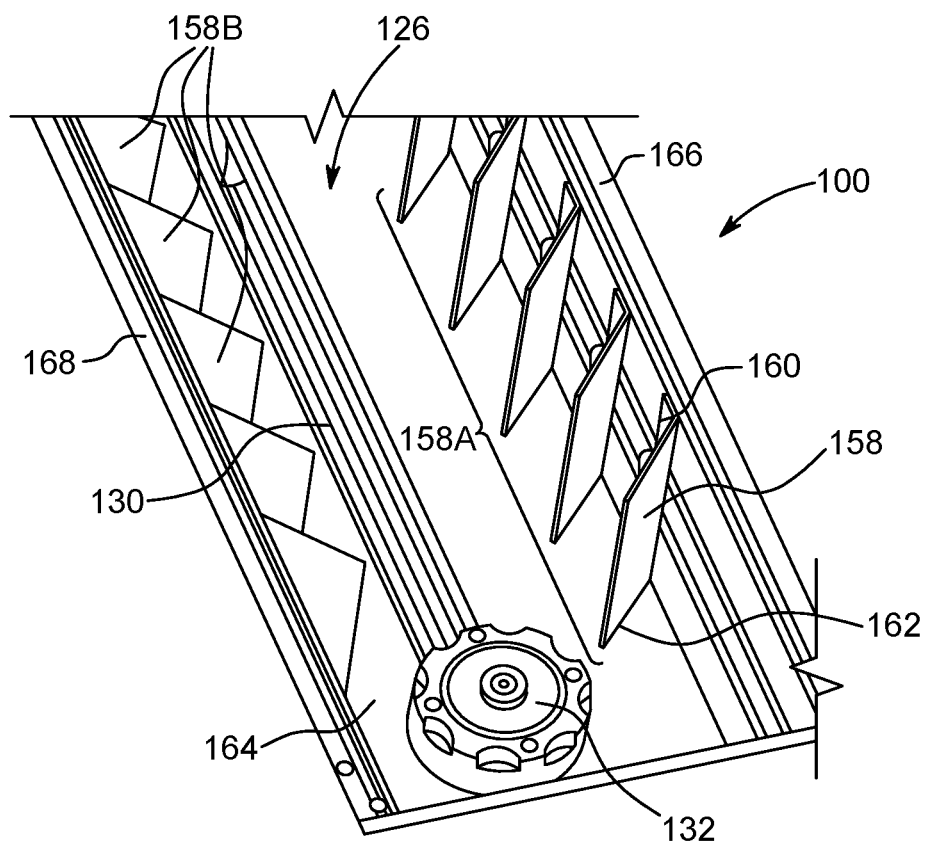
FIG. 5 is a detailed top perspective view of the inert ultraviolet curing apparatus shown in FIG. 1 with a top portion of a housing removed.

With reference to FIGS. 4-5, the curing apparatus 100 includes a plurality of baffles 158 configured for minimizing mixing between the ambient atmosphere in the loading chamber 122 and the controlled atmosphere in the curing chamber 124. In some examples or aspects, the plurality of baffles 158 may be provided in the transition chamber 126.

Each of the plurality of baffles 158 may be connected to one more sidewalls of the housing 102, such as one or more of the sidewalls of the transition chamber 126. For example, each of the plurality of baffles 158 may be connected to one or more of the upper portion or sidewall 114, the lower portion or sidewall 116, and the longitudinal portions or sidewalls 120 of the housing 102. FIGS. 4-5 show the plurality of baffles 158 protruding from the longitudinal portions or sidewalls 120 of the housing 102 in the transition chamber 126. The plurality of baffles 158 may be removably or non-removably connected to one or more of the upper portion or sidewall 114, the lower portion or sidewall 116, and the longitudinal portions or sidewalls 120 of the housing 102. In some embodiments or aspects, the plurality of baffles 158 may be connected to an intermediate element that is connected to one or more of the upper portion or sidewall 114, the lower portion or sidewall 116, and the longitudinal portions or sidewalls 120 of the housing 102.

With continued reference to FIGS. 4-5, each of the plurality of baffles 158 comprises a first end 160 connected to one or more of the upper portion or sidewall 114, the lower portion or sidewall 116, and the longitudinal portions or sidewalls 120 of the housing 102 and a second, free end 162 protruding toward a transition guideway 164 of the transition portion 112. Each of the plurality of baffles 158 is angled toward the loading portion 108. Each of the plurality of baffles 158 may be angled toward the loading portion 108 at a same angle. In some examples, the plurality of baffles 158 may be angled toward the loading portion 108 at different angles.

With continued reference to FIGS. 4-5, the plurality of baffles 158 are arranged in two rows on opposing sides of the transition guideway 164. The plurality of baffles 158 may include a first set of baffles 158*a* extending from a first sidewall 166 of the transition portion 112 and a second set of baffles 158*b* extending from a second sidewall 168 of the transition portion 112. The first set of baffles 158*a* is separated from the second set of baffles 158*b* by a distance D sufficient to allow for unobstructed passage of the carrier 128 carrying the optical article 200 through the transition portion 112. The plurality of baffles 158 may be aligned such that the second end 162 of each of the first set of baffles 158*a* is positioned across from the second end 162 of each of the second set of baffles 158*b*.

With reference to FIG. 4, the curing chamber 124 of the curing apparatus 100 may have an atmosphere that is different from the atmosphere outside the curing chamber 124. In some examples or aspects, the curing chamber 124 may have an inert atmosphere due to increased concentration of an inert gas, such as nitrogen or one or more noble gases. Without intending to be bound by theory, it has been found that curing of the coating covering the optical article 200 can be significantly improved when the coating is cured in a controlled and inert atmosphere that is different from ambient atmosphere. The plurality of baffles 158 are configured to act as a barrier to a flow of ambient air from the loading chamber 122 into the curing chamber 124 during movement of the optical article 200 from the loading chamber 122 into the curing chamber 124, and to act as a barrier to a flow of the inert atmosphere out of the curing chamber 124 during movement of the optical article 200 from the curing chamber 124 toward the loading chamber 122. For example, during movement of the optical article 200 between the loading chamber 122 and the curing chamber 124, the optical article 200 causes the air surrounding it to move. The plurality of baffles 158 are configured to minimize the movement of air around the optical article 200 so as to minimize an exchange between the ambient air in the loading chamber 122 and the inert gas in the curing chamber 124. In this manner, introduction of the ambient atmosphere (i.e., oxygen) from the loading chamber 122 into the inert atmosphere in the curing chamber 124 can be minimized in order to conserve the use of inert gas.

With continued reference to FIG. 4, at least one nozzle 170 may be provided for delivering the inert gas into the curing chamber 124. The at least one nozzle 170 is in communication with a vessel 172 containing the inert gas. In some examples, a plurality of nozzles 170 may be provided. The at least one nozzle 170 extends into the curing chamber 124 through one or more of the upper portion or sidewall 114, the lower portion or sidewall 116 of the housing 102 to deliver the inert gas into the curing chamber 124. In some examples or aspects, the at least one nozzle 170 may be configured for delivering the inert gas into the interior chamber 124 at a fixed flow rate and pressure. In other examples or aspects, the at least one nozzle 170 may be adjustable to control the flow rate and pressure at which the inert gas is delivered to the curing chamber 124. In such examples or aspects, a proportioning valve 174 may be provided for controlling the flow rate and pressure of the at least one nozzle 170. The proportioning valve 174 may be manually or electronically adjustable. Flow rate and pressure of the inert gas flowing through the at least one nozzle 170 may be controlled by a controller, as described herein.

At least one sensor 176 may be provided for detecting a concentration of oxygen in the curing chamber 124. By determining a concentration of oxygen in the curing chamber 124, a controller associated with the at least one sensor 176 may determine a concentration of the inert gas in the curing chamber 124. Output from the at least one sensor 176 may be used for adjusting a flow rate of the inert gas through the at least one nozzle 170 to maintain the concentration of the inert gas at a predetermined level.

With reference to FIG. 4, the curing apparatus 100 may have at least one diffuser plate 178 disposed between the at least one nozzle 170 and the curing chamber 124. The at least one diffuser plate 178 may have a plurality of openings 180 configured for flowing the inert gas therethrough and into the curing chamber 124. The openings 180 may have a small diameter, such as around 5 μm, in order to evenly diffuse the inert gas within the curing chamber 124.

With reference to FIG. 2, the curing apparatus 100 has at least one controller 182 operatively connected to at least one component of the curing apparatus 100. In some examples or aspects, the at least one controller 182 may be configured to control operation of at least one of the drive element 134 of the transfer mechanism 132, the rotatable holder 136 of the carrier 128, the UV source 150, and the valve 174 of the nozzle 170. In other examples or aspects, separate controllers 182 may be provided for each of the drive element 134 of the transfer mechanism 132, the rotatable holder 136 of the carrier 128, the UV source 150, and the valve 174 of the nozzle 170.

In some examples or aspects, the at least one controller 150 may be a microprocessor controller. The at least one controller 150 may be configured for pulse width modulated (PWM) operation, wherein analog operation of at least one of the drive element 134 of the transfer mechanism 132, the rotatable holder 136 of the carrier 128, the UV source 150, and the valve 174 of the nozzle 170 can be achieved using digital control signals. In some examples or aspects, the at least one controller 182 may be configured for continuously modulated control of at least one of the drive element 134 of the transfer mechanism 132, the rotatable holder 136 of the carrier 128, the UV source 150, and the valve 174 of the nozzle 170. The at least one controller 182 may have memory configured for storing one or more predetermined automated curing processes, as discussed herein. In some examples or aspects, the at least one controller 182 may be configured for operating on a 110V or a 220V AC power circuit, and/or on battery power. In other examples or aspects, the at least one controller 182 may be configured for operating on a 12V DC power circuit.

Having described the curing apparatus 100 with reference to FIGS. 1-5, an exemplary method 300 of using the curing apparatus 100 to cure a coating applied on the optical article 200, will now be described with reference to FIG. 6. In some examples or aspects, the curing apparatus 100 may be configured for curing the coating applied on a single optical article 200. In other examples or aspects, the curing apparatus 100 may be configured for curing the coating applied to a plurality of optical article 200 in a batch processes.

Figure 6:
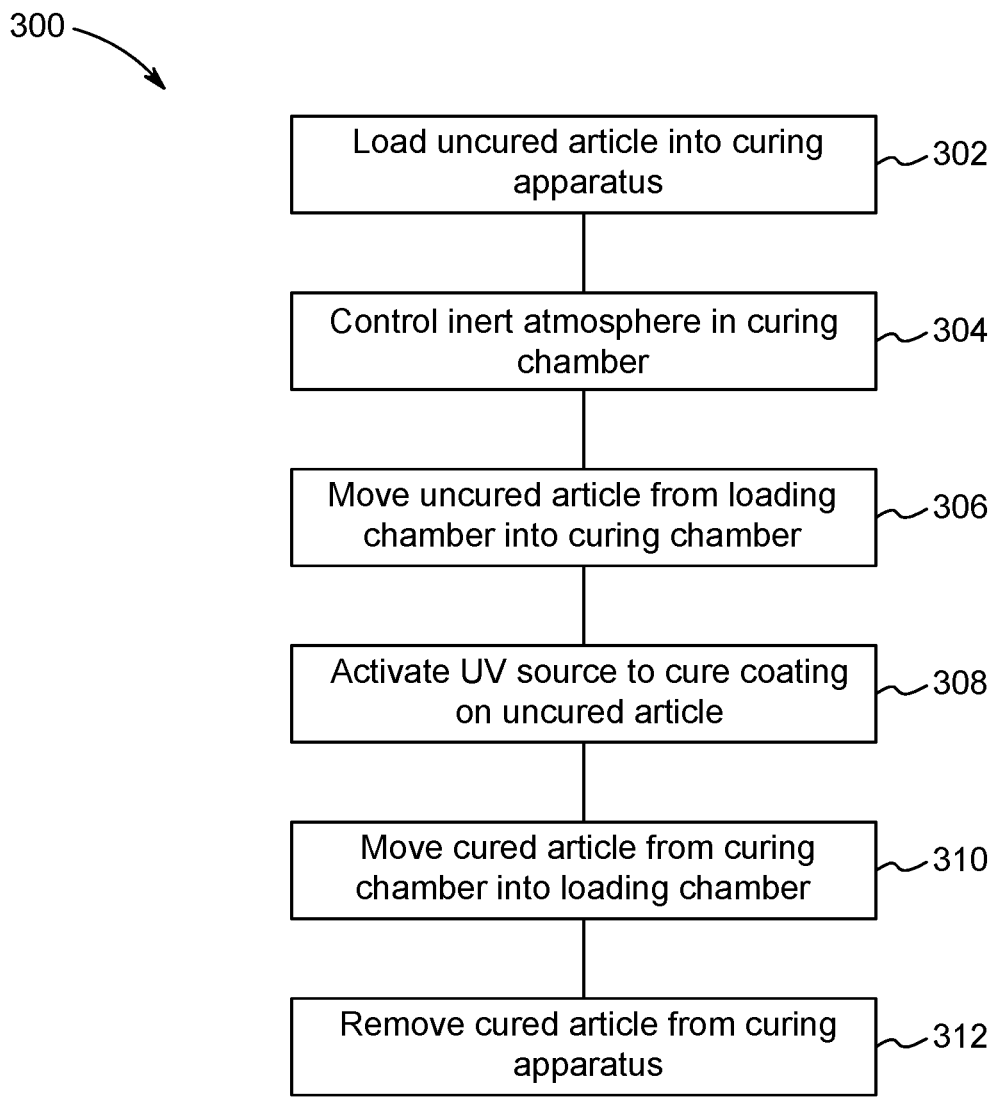
FIG. 6 is a flow chart of a method for curing optical articles using an inert ultraviolet curing apparatus in accordance with some examples or aspects of the present disclosure.

With reference to FIG. 6, at step 302, a coated but uncured optical article 200 is loaded into the curing apparatus 100. For example, the optical article 200 can be loaded into the curing apparatus 100 by opening the door 123 to the loading portion 108 and loading the optical article 200 onto the carrier 128 positioned in the loading chamber 122. The optical article 200 is secured to the carrier 128 by actuating the vacuum chuck 142.

At step 304, the inert atmosphere in the curing chamber 124 is controlled to a desired level. For example, the inert gas from the vessel 172 is delivered into the curing chamber 124 via the at least one nozzle 170. The at least one sensor 176 is used to determine the oxygen content in the inert atmosphere and flow of the inert gas can be adjusted via the valve 174 in order to reach a predetermined threshold inside the curing chamber 124.

At step 306, the optical article 200 is moved from the loading chamber 122 into the curing chamber 124. For example, the drive element 134 of the transfer mechanism 132 is actuated to move the carrier 128 from the loading chamber 122 into the curing chamber 124 via the transition chamber 126. During movement of the carrier 128 through the transition chamber 126, the plurality of baffles 158 are configured to minimize an exchange between an ambient atmosphere in the loading chamber 122 and the inert atmosphere in the curing chamber 124.

After positioning the carrier 128 in the curing chamber 124, the UV source 150 is actuated in step 308 to initiate the curing process. The optical article 200 may be rotated about the rotation axis 138 of the rotatable holder 138 of the carrier 128.

After the curing process is completed, the optical article 200 is moved in step 310 from the curing chamber 124 back into the loading chamber 122. For example, the drive element 134 of the transfer mechanism 132 is actuated to move the carrier 128 from the curing chamber 124 into the loading chamber 122 via the transition chamber 126. During movement of the carrier 128 through the transition chamber 126, the plurality of baffles 158 are configured to minimize an exchange between an ambient atmosphere in the loading chamber 122 and the inert atmosphere in the curing chamber 124.

At step 312, the cured optical article 200 is unloaded from the curing apparatus 100. For example, the optical article 200 can be unloaded from the curing apparatus 100 by opening the door 123 to the loading portion 108 and unloading the optical article 200 from the carrier 128 positioned in the loading chamber 122. The vacuum chuck 142 is deactivated to permit the optical article 200 to be removed from the carrier 128.

The present invention has been described with reference to specific details of particular examples thereof. It is not intended that such details be regarded as limitations upon the scope of the invention except insofar as and to the extent that they are included in the accompanying claims.

What is claimed is:

1. A curing apparatus comprising:
   a housing having a loading portion open to ambient atmosphere, a curing portion having a curing chamber with a controlled atmosphere, and a transition portion extending between the loading portion and the curing portion;
   a carrier movable between the loading portion and the curing chamber via the transition portion; and
   at least one ultraviolet radiation source operative for transmitting ultraviolet radiation into the curing chamber,
   wherein the transition portion comprises a plurality of baffles protruding from a sidewall of the transition portion and configured for minimizing mixing between the ambient atmosphere and the controlled atmosphere during movement of the carrier between the loading portion and the curing chamber.

2. The curing apparatus according to claim 1, wherein each of the plurality of baffles is angled toward the loading portion.

3. The curing apparatus according to claim 1, wherein each of the plurality of baffles comprises a first end connected to the sidewall of the transition portion and a second, free end protruding toward a transition guideway of the transition portion.

4. The curing apparatus according to claim 1, wherein the plurality of baffles comprises a first set of baffles extending from a first sidewall of the transition portion and a second set of baffles extending from a second sidewall of the transition portion.

5. The curing apparatus according to claim 4, wherein the plurality of baffles are aligned such that a terminal end of the first set of baffles is positioned across from a terminal end of the second set of baffles.

6. The curing apparatus according to claim 1, wherein the loading portion comprises a door for enclosing the loading portion.

7. The curing apparatus according to claim 1, further comprising a transfer mechanism for moving the carrier between the loading portion and the curing portion.

8. The curing apparatus according to claim 7, wherein the transfer mechanism comprises a motor, a linear actuator, or a rotary actuator.

9. The curing apparatus according to claim 1, wherein the carrier comprises a rotatable holder configured to rotate about a rotation axis when the carrier is positioned in the curing chamber.

10. The curing apparatus according to claim 9, wherein the rotatable holder comprises a vacuum chuck configured for securing an article to the rotatable holder using vacuum.

11. The curing apparatus according to claim 1, further comprising at least one sensor in the curing chamber configured for measuring oxygen content in the curing chamber.

12. The curing apparatus according claim 1, further comprising at least one nozzle in fluid communication with the curing chamber, wherein the at least one nozzle is configured for delivering an inert gas to the curing chamber.

13. The curing apparatus according to claim 12, wherein the at least one nozzle is configured for delivering the inert gas to the curing chamber at a constant pressure and constant flow rate.

14. The curing apparatus according to claim 1, further comprising a diffuser between the at least one nozzle and the curing chamber, the diffuser configured for diffusing a flow of the insert gas into the curing chamber.

15. The curing apparatus according to claim 1, further comprising an ultraviolet radiation filter disposed between the at least one ultraviolet radiation source and the curing chamber.

* * * * *